United States Patent
Saad et al.

(10) Patent No.: US 9,285,499 B2
(45) Date of Patent: Mar. 15, 2016

(54) DEVICE FOR DETECTING AND/OR MONITORING OPTICALLY INVISIBLE OBJECTS

(71) Applicant: SOCIETE PLYMOUTH FRANCAISE, Feyzin (FR)

(72) Inventors: Mounir Saad, Strasbourg (FR); Daniel Arnaud, Saint Etienne (FR)

(73) Assignee: SOCIETE PLYMOUTH FRANCAISE (FR)

( * ) Notice: Subject to any disclaimer, the term of this patent is extended or adjusted under 35 U.S.C. 154(b) by 12 days.

(21) Appl. No.: 14/365,707

(22) PCT Filed: Dec. 14, 2012

(86) PCT No.: PCT/FR2012/052945
§ 371 (c)(1),
(2) Date: Jun. 16, 2014

(87) PCT Pub. No.: WO2013/088092
PCT Pub. Date: Jun. 20, 2013

(65) Prior Publication Data
US 2014/0306100 A1    Oct. 16, 2014

(30) Foreign Application Priority Data

Dec. 14, 2011 (FR) ...................... 11 61613

(51) Int. Cl.
*G01V 8/00* (2006.01)
*G01V 8/10* (2006.01)
*G01V 15/00* (2006.01)
*G01V 3/00* (2006.01)

(52) U.S. Cl.
CPC .. *G01V 8/10* (2013.01); *G01V 3/00* (2013.01); *G01V 15/00* (2013.01)

(58) Field of Classification Search
CPC .................................. G01V 3/00; G01V 8/00
USPC ............ 250/227.11, 227.14, 227.15, 227.16, 250/227.24; 73/40.5 A, 592, 597; 324/326; 138/104
See application file for complete search history.

(56) References Cited

U.S. PATENT DOCUMENTS

| | | | | |
|---|---|---|---|---|
| 6,092,558 A | * | 7/2000 | Maccario | F16L 1/11 116/209 |
| 6,595,038 B2 | * | 7/2003 | Williams | G01M 3/24 73/40.5 A |
| 2003/0231020 A1 | | 12/2003 | Yonezawa et al. | |

FOREIGN PATENT DOCUMENTS

FR     2776135 A1    9/1999
JP     5001789 A     1/1993

OTHER PUBLICATIONS

International Search Report issued May 14, 2013 re: PCT/FR2012/052945; 4 pages; citing: JP 5 001789 A, US 2003/231020 A1 and FR 2 776 135 A1.

* cited by examiner

*Primary Examiner* — Kevin Pyo
(74) *Attorney, Agent, or Firm* — Cantor Colburn LLP

(57) ABSTRACT

This detecting and/or monitoring device (2) is intended to be mounted on optically invisible objects and to be placed substantially parallel to the general direction of said objects. The detecting and/or monitoring device (2) comprises at least one electrically or optically conductive linear element (3) and an insulating sheath (4) covering the linear element. The insulating sheath (4) comprises at least one first face (5) having at least one substantially flat portion (5a) intended to be mounted on said objects.

12 Claims, 3 Drawing Sheets

DEVICE FOR DETECTING AND/OR MONITORING OPTICALLY INVISIBLE OBJECTS

TECHNICAL FIELD

The present invention relates to a device for detecting and/or monitoring optically invisible objects.

BACKGROUND

The difficulty of obtaining information about the presence, route and nature of buried pipes or lines resides in the fact that, most of the time, nothing is visible from the outside and that the existing planes often prove to be imprecise, incomplete, and even sometimes erroneous or nonexistent.

To save time, reduce costs and also improve safety, it is important to be able to detect the presence of such pipes and lines, and to locate them accurately, without digging the ground, nor destroying the structures when carrying out subsequent works. In general, the processes used must be simple to implement by site personnel with modest qualifications. Furthermore, the equipment used to implement these detection processes must be robust and reliable and its cost must remain lower than the investment that would require updating by excavation of the buried structures or of their warning mesh to ensure their presence.

Several processes may be used for detecting buried pipes.

Detection in electromagnetic way is the most commonly used method. This electromagnetic detection can be performed by injecting, using a current generator, an electric signal in an electrically conductive linear element associated with a pipe to be identified and disposed following the route of the latter, and this via connection boxes installed at regular distances along the pipe to serve as access points, and by using an electromagnetic detector arranged to sense an electromagnetic field created by an alternating current flowing in the electrically conductive element.

In a manner known per se, the electrically conductive element is covered with a cylindrical sheath made from electrically insulating material and is secured on the pipe to be identified using fastening means, such as for example circlips, self-gripping tapes, or adhesive tapes.

Such fastening means allow, for the most part, to move the electrically conductive element on the outer surface of the optically invisible object to be identified, especially when the optically invisible object is of circular section. These movements of the electrically conductive element may lead to imprecise positioning of the electrically conductive element, and thus to imprecise and difficult detection of the optically invisible associated object.

Yet, taking into account the drastic changes in the accuracy standards as far as detection of optically invisible object is concerned, it is necessary to ensure optimum positioning of the electrically conductive element, including after burial of the optically invisible associated object.

BRIEF SUMMARY

The present invention aims to overcome these drawbacks.

The technical problem underlying the invention comprises, therefore, in providing a device for detecting and/or monitoring optically invisible objects with a simple and economical structure, while ensuring optimum positioning of the device on an object to be monitored and/or detected.

To this end, the present invention relates to a device for detecting and/or monitoring optically invisible objects such as buried pipes, warning systems or bodies buried in ground or drowned in a civil engineering structure, this device being intended to be mounted on said objects and disposed substantially parallel to the general or main direction of said objects, this device including:

- at least one electrically or optically conductive linear element, the at least one linear element extending longitudinally,
- an insulating sheath covering at least one linear element, the insulating sheath including at least one first face intended to be mounted on said objects, the first face extending substantially along a plane and including a first substantially flat portion, and
- the first attachment means arranged on the first face of the insulating sheath and arranged to cooperate with the outer surface of said objects, the first attachment means comprising a first series of longitudinal ridges and a second series of longitudinal ridges disposed respectively on either side of the first substantially flat portion.

In other words, when the device is disposed on a flat support, the first face extends substantially parallel to the flat support.

The structure of the first face of the insulating sheath and the presence of the first attachment means ensure stability of the device for detecting and/or monitoring the optically invisible associated object, and this by limiting the risks of displacement of the device during the burial of the associated object. This results in optimum final positioning of the detection and/or monitoring device. For example, when the optically invisible associated object is of circular section, such as a pipe, the device according to the invention allows to ensure optimum and stable positioning of the linear element along the upper generatrix of the optically invisible object.

Thus, when the linear element is electrically conductive, the device according to the invention ensures an easy and precise electromagnetic detection of the optically invisible object.

When the linear element is optically conductive, and more specifically, when it is an optical fiber, any breakage of the device according to the invention, and thus of the linear element, allows, on the one hand, to immediately inform an operator of the breakage of the device, and, on the other hand, to find the exact location of the breakage area, for example by analyzing the characteristic values of the light beam passing through the optically conductive linear element.

Therefore, the structure of the device according the invention, by ensuring optimum positioning of the latter on the upper generatrix of a pipe, ensures breakage of the device according to the invention, and more specifically of the optically conductive linear element during most pipeline stresses caused, for example, by the bucket of an excavator. The device according to the invention therefore allows an operator to know the exact condition of the pipeline.

It should be noted that the first face may be rough or present surface roughness, without this definition running counter to the characteristic that the first face extends substantially along a plane.

Advantageously, the insulating sheath includes at least a second face opposite the first face, the first and second faces being substantially parallel. The insulating sheath may, for example, be polygonal, and in particular trapezoidal or parallelepipedic.

According to one embodiment of the invention, the insulating sheath is of substantially rectangular section.

According to one embodiment of the invention, the second face comprises a second substantially flat portion substantially parallel to the first substantially flat portion.

Preferably, the detection and/or monitoring device comprises the second attachment means arranged on the second face of the insulating sheath, the second attachment means including a first series of longitudinal ridges and a second series of longitudinal ridges disposed respectively on either side of the second substantially flat portion. Thus, regardless of the orientation of the insulating sheath relative to the optically invisible associated object, the detection and/or monitoring device will comprise first and second series of longitudinal ridges opposite the object.

The first and/or second attachment means are, for example, arranged near the side edges of the insulating sheath.

Preferably, the at least one linear element extends between the first and second substantially flat portions and is disposed substantially equidistant relative to the first and second substantially flat portions.

According to one embodiment of the invention, the device comprises fastening means arranged to secure the insulating sheath on the outer surface of said objects.

The fastening means advantageously include adhesive means disposed on at least the first face of the insulating sheath. The adhesive means comprise, for example, an adhesive mass disposed on the first face of the insulating sheath and a protective film detachably disposed on the adhesive mass. The adhesive mass may be formed by water-based acrylic adhesive.

It is also possible to secure the device on the optically invisible associated object using local supplies of adhesive mass. In this case, the adhesive mass may be of different chemical natures. Silicones, esters of acrylic acid and rubbery masses may be mentioned, without this list being restrictive.

According to another embodiment of the invention, adhesion of the device on the object to be detected and/or monitored may be obtained directly by putting the first surface of the insulating sheath in contact with the object. For this purpose, the insulating sheath comprises at least a first portion on which the first face of the insulating sheath is arranged, the first portion being formed, for example, from a first material capable of promoting adhesion of the insulating sheath on the optically invisible associated object. The first material may, for example, be a polymer with sufficiently strong stickiness. Such stickiness may be obtained, for example, with a polymer having a low glass transition temperature and a low degree of crystallinity.

Advantageously, the insulating sheath comprises a second portion on which the second face of the sheath is arranged, the second portion being formed from a second material different from the first material. The first and second materials may, for example, be two polymers of different natures.

According to one embodiment of the invention, the first and second materials have different physico-chemical natures. The first and second portions of the insulating sheath may, for example, be obtained by co-extruding two polymers of different natures.

Advantageously, the first and second portions are disposed one above the other and form respectively a first and a second layers.

According to one embodiment of the invention, the detection and/or monitoring device comprises at least one electrically conductive linear element. Thus, the detection and/or monitoring device forms a detection device for identifying and monitoring optically invisible objects. The at least one electrically conductive linear element may be a wire, preferably made from stainless steel.

According to one embodiment of the invention, the detection and/or monitoring device comprises at least one optically conductive linear element. The at least one optically conductive linear element may be an optical fiber.

According to one embodiment of the invention, the detection and/or monitoring device comprises a plurality of linear elements offset from each other and covered with the insulating sheath.

According to one embodiment of the invention, each longitudinal ridge is of substantially triangular section.

The detection and/or monitoring device may, for example, comprise a plurality of electrically conductive linear elements. These arrangements allow to ensure, in case of breakage of one of the linear elements, the flow of an electric current along the device via another linear element, and thus the identification of the optically invisible associated object.

According to one embodiment of the invention, the device comprises at least an optically conductive linear element, such as an optical fiber, and at least an electrically conductive linear element, such as a wire. These arrangements allow, on the one hand, to ensure the identification and monitoring of the optically invisible associated object, and on the other hand, to immediately inform an operator of a breakage of the device.

Advantageously, at least the first and/or second face of the insulating sheath comprises a marking area arranged to receive inscriptions. The marking area may be formed, for example, on the substantially flat portion of the second face of the insulating sheath.

According to one embodiment of the invention, each linear element extends along substantially the entire length of the insulating sheath.

According to one embodiment of the invention, the first and second series of the first and second attachment means include each a plurality of longitudinal ridges and, for example, at least three longitudinal ridges.

The present invention further relates to an assembly including a plurality of detection and/or monitoring devices according to the invention, and at least a connection box in which connecting means are housed to connect the linear elements of at least two adjacent detection and/or monitoring devices.

The box may, for example, be disposed either in a technical gallery or on an unburied terminal or on an accessory constituting the network to be detected.

The box is advantageously hermetic so as to protect the connecting means from external environment stresses. The nature of the material constituting the box is adapted to ensure a mechanical protection for the connecting means. The box may, for example, be made from plastic.

BRIEF DESCRIPTION OF THE DRAWINGS

In any case, the invention will be better understood using the following description with reference to the appended schematic drawing representing, by way of non-limiting examples, various embodiments of this detection and/or monitoring device.

DETAILED DESCRIPTION

FIGS. 1 to 4 show a device 2 for detecting and/or monitoring optically invisible objects, such as such as buried pipes, warning systems or bodies buried in ground or drowned in a civil engineering structure. The detection and/or monitoring device 2 is intended to be mounted on the optically invisible objects, and disposed substantially parallel to the general direction of said objects.

Figure 1:
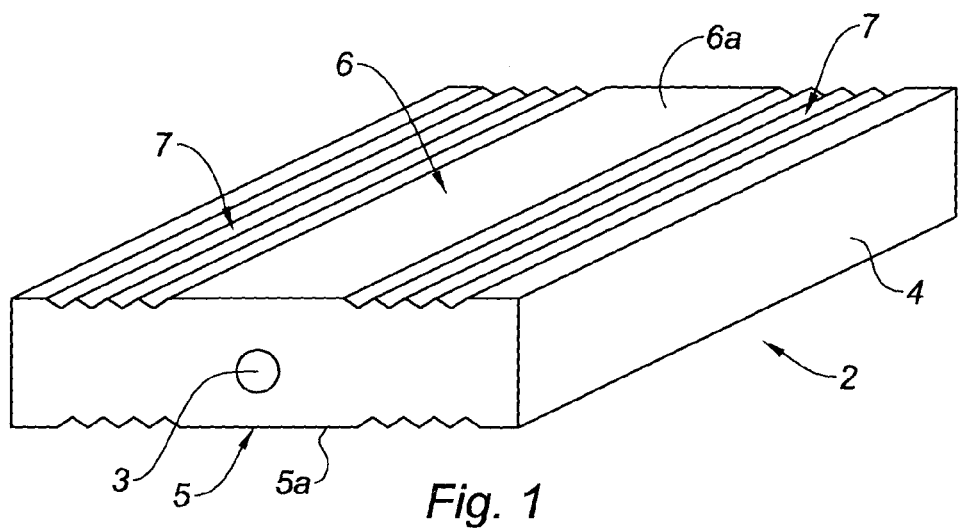
FIG. 1 is a perspective view of a detection and/or monitoring device according to a first embodiment of the invention.
Figure 2:
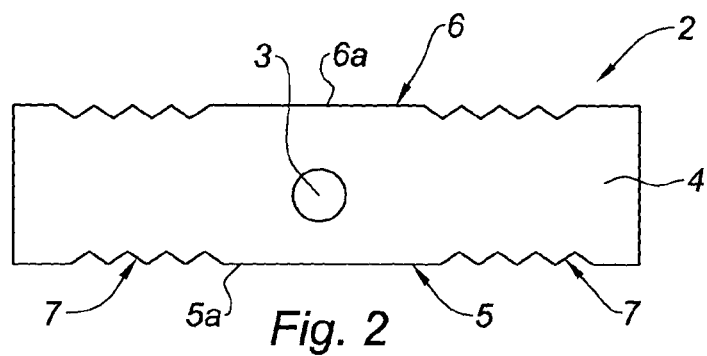
FIG. 2 is a cross-sectional view of the detection and/or monitoring device of FIG. 1.

As shown in FIGS. 1 and 2, the detection and/or monitoring device 2 comprises an electrically or optically conductive linear element 3 extending longitudinally, and an insulating sheath 4 covering the linear element 3.

The linear element 3 may be a wire, preferably made from stainless steel when there is a desire to identify and monitor an optically invisible object, or an optical fiber when there is a desire to monitor an optically invisible object. The insulating sheath 4 may, for example, be made of polypropylene.

As shown in FIG. 1, the insulating sheath 4 is substantially parallelepipedic, and is thus preferably of substantially rectangular section. The insulating sheath 4 includes a first face 5 and a second face 6 opposite the first face 5. The first and second faces 5, 6 are substantially parallel and each have a substantially flat central portion 5a, 6a.

The detection and/or monitoring device 2 further comprises a plurality of longitudinal attachment ridges 7 arranged on each of the first and second faces 5, 6 of the insulating sheath 4 near the side edges of the latter. In operating conditions, the attachment ridges 7, arranged on the face of the insulating sheath 4 facing the object to be detected and/or monitored, are arranged to cooperate with the outer surface of the object in order to improve the stability of the device relative to the object, and the attachment ridges 7, arranged on the face of the insulating sheath 4 facing opposite the object to be detected and/or monitored, are arranged to cooperate with the backfill, such as soil, disposed over the device to improve the stability of the device relative to the backfill.

The detection and/or monitoring device 2 also comprises fastening means arranged to secure the insulating sheath 4 on the outer surface of objects to be identified.

According to a first embodiment, the fastening means include adhesive means disposed on the first face 5 of the insulating sheath 4. The adhesive means comprise, for example, an adhesive mass disposed on the first face 5 of the insulating sheath 4 and a protective film detachably disposed on the adhesive mass.

According to a second embodiment, the fastening means include a plurality of fastener members, such as, for example, circlips, self-gripping tapes or adhesive tapes, intended to be mounted around the invisible optically associated object and longitudinally offset along the latter.

Figure 3:
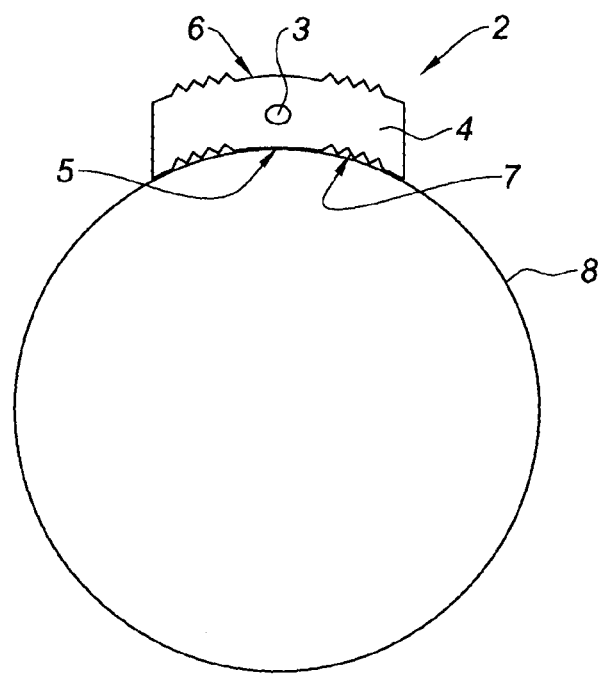
FIG. 3 is a cross-sectional view of the detection and/or monitoring device of FIG. 1 positioned on a small-diameter pipe.
Figure 4:
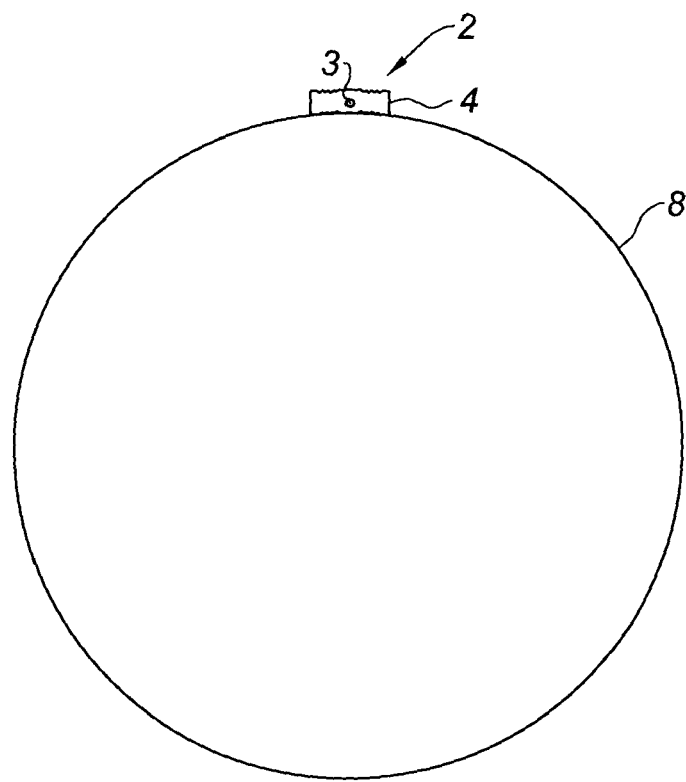
FIG. 4 is a cross-sectional view of the detection and/or monitoring device of FIG. 1 positioned on a large-diameter pipe.

FIGS. 3 and 4 show the detection and/or monitoring device 2 positioned on a pipe 8 of small diameter and large diameter respectively. As shown more particularly in FIG. 3, the insulating sheath 4 is deformable so as to increase the contact surface between the first face 5 and the pipe 8, in order to improve further the stability of the device 2.

Furthermore, as shown in FIGS. 3 and 4, the detection and/or monitoring device 2 is intended to extend substantially along the upper generatrix of the pipe 8.

Figure 5:
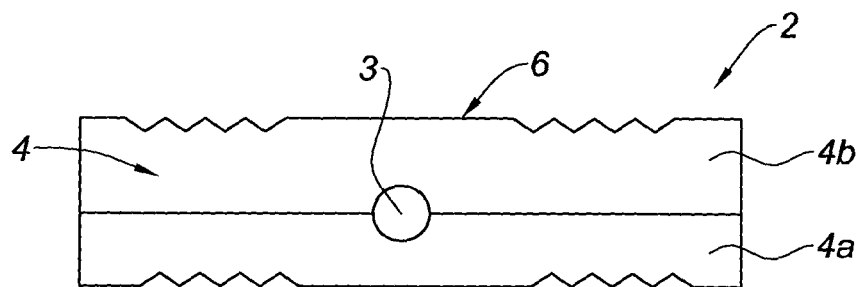
FIG. 5 is a cross-sectional view of a detection and/or monitoring device according to a second embodiment.

According to a second embodiment of the invention shown in FIG. 5, the insulating sheath 4 comprises a first layer 4a formed from a first material and on which the first face 5 of the insulating sheath 4 is arranged, and a second layer 4b disposed on the first layer 4a and on which the second face 6 of the insulating sheath 4 is arranged. The second layer 4b is formed from a second material different from the first material.

Advantageously, the first material is capable to promote adhesion of the insulating sheath 4 on the optically invisible associated object. These arrangements allow to do without additional fastening means, or at least improve further the stability of the detection and/or monitoring device 2.

The first and second portions of the insulating sheath 4 may, for example, be obtained by co-extruding two polymers of different natures.

Figure 6:
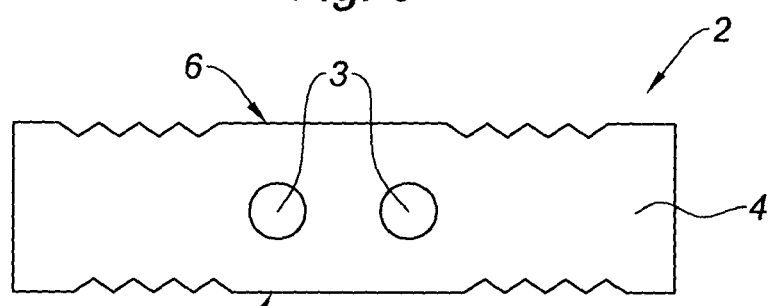
FIG. 6 is a cross-sectional view of a detection and/or monitoring device according to a third embodiment.

According to a third embodiment of the invention shown in FIG. 6, the detection and/or monitoring device 2 comprises two linear elements 3 laterally offset from each other and covered with the insulating sheath 4. The two linear elements 3 may, for example, be two electrically conductive elements, two optically conductive elements, or an electrically conductive element and an optically conductive element.

Figure 7:
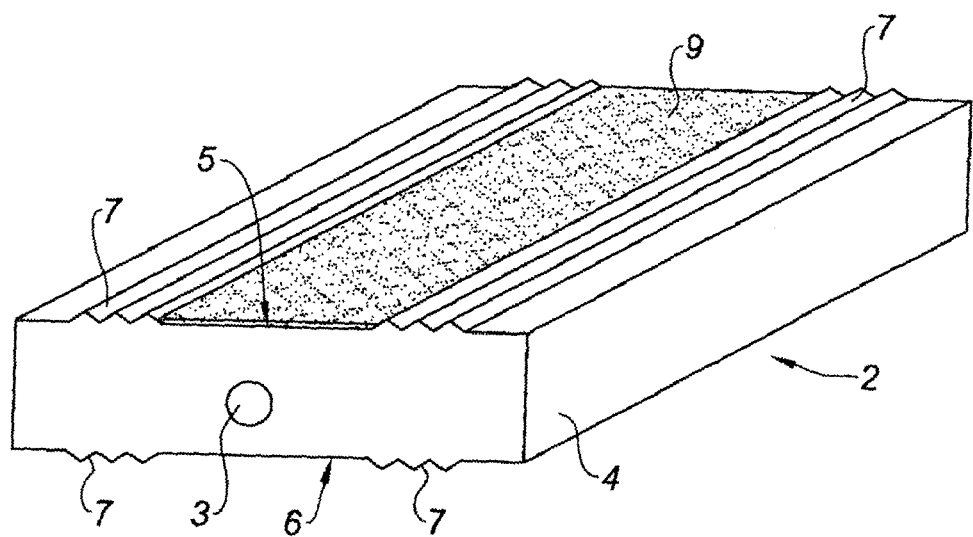
FIG. 7 is a perspective view of a detection and/or monitoring device according to a fourth embodiment.

According to a fourth embodiment of the invention shown in FIG. 7, the attachment ridges 7 protrude respectively from the first and second faces 5, 6 of the insulating sheath 4, and the fastening means include an adhesive mass 9 disposed on the central portion 5a of the first face 5 of the insulating sheath 4.

It goes with saying that the invention is not limited to the only embodiments of this detection and/or monitoring device, described above as examples; on the contrary, it encompasses all the alternative embodiments.

The invention claimed is:

1. A device for detecting and/or monitoring optically invisible objects, this device being intended to be mounted on said objects and disposed substantially parallel to a general direction of said objects, this device including:
   at least one electrically or optically conductive linear element, the at least one linear element extending longitudinally,
   an insulating sheath covering the at least one linear element, the insulating sheath including at least a first face intended to be mounted on said objects, the first face extending substantially along a plane and including a first substantially flat portion, wherein the insulating sheath includes at least a second face opposite to the first face, the first and second faces being substantially parallel, wherein the second face includes a second substantially flat portion substantially parallel to the first substantially flat portion, wherein the at least one linear element extends between the first and second substantially flat portions, and is disposed substantially equidistant relative to the first and second substantially flat portions, and
   first attachment means arranged on the first face of the insulating sheath and arranged to cooperate with an outer surface of said objects, the first attachment means comprising a first series of longitudinal ridges and a second series of longitudinal ridges disposed respectively on either side of the first substantially flat portion.

2. The device according to claim 1, which comprises second attachment means arranged on the second face of the insulating sheath, the second attachment means including a first series of longitudinal ridges and a second series of longitudinal ridges disposed respectively on either side of the second substantially flat portion.

3. The device according to claim 1, wherein the first and/or second attachment means are arranged near side edges of the insulating sheath.

4. The device according to claim 1, which comprises fastening means arranged to secure the insulating sheath on the outer surface of said objects.

5. The device according to claim 4, wherein the fastening means include adhesive means disposed on at least the first face of the insulating sheath.

6. The device according to claim 5, wherein the adhesive means comprise an adhesive mass disposed on the first face of the insulating sheath, and a protective film detachably disposed on the adhesive mass.

7. The device according to claim 1, wherein the insulating sheath comprises at least a first portion on which the first face of the insulating sheath is arranged, the first portion being formed from a first material capable to promote adhesion of the insulating sheath on the associated optically invisible object.

8. The device according to claim 7, wherein the insulating sheath comprises a second portion on which the second face of the insulating sheath is arranged, the second portion being formed from a second material different from the first material.

9. The device according to claim 1, which comprises at least one electrically conductive linear element.

10. The device according to claim 1, which comprises at least one optically conductive linear element.

11. The device according to claim 1, wherein at least the first and/or second face of the insulating sheath comprises a marking area arranged to receive inscriptions.

12. An assembly including a plurality of detection and/or monitoring devices according to claim 1, and at least one connection box wherein connecting means, arranged to connect the linear elements of at least two adjacent detection and/or monitoring devices, are housed.

* * * * *